United States Patent [19]

Sukkar

[11] Patent Number: 5,440,662
[45] Date of Patent: Aug. 8, 1995

[54] KEYWORD/NON-KEYWORD CLASSIFICATION IN ISOLATED WORD SPEECH RECOGNITION

[75] Inventor: Rafid A. Sukkar, Aurora, Ill.

[73] Assignee: AT&T Corp., Murray Hill, N.J.

[21] Appl. No.: 989,299

[22] Filed: Dec. 11, 1992

[51] Int. Cl.$^6$ ............................................. G10L 9/18
[52] U.S. Cl. .................... 395/2.45; 395/2.65
[58] Field of Search .................. 395/2.45, 2.47, 2.49, 395/2.65

[56] References Cited

U.S. PATENT DOCUMENTS

| | | | |
|---|---|---|---|
| 4,713,777 | 12/1987 | Kloustad et al. | 364/513.5 |
| 5,125,022 | 6/1992 | Hunt et al. | 379/88 |
| 5,127,043 | 6/1992 | Hunt et al. | 379/88 |
| 5,199,077 | 3/1993 | Wilcox et al. | 381/43 |
| 5,303,299 | 4/1994 | Hunt et al. | 379/88 |

OTHER PUBLICATIONS

"Accessing Custom Calling Telephone Services Using Speech Recognition", by R. A. Sukkar & K. V. Kinder, pp. 994–999.

"Speech Recognition Using Segmented Neural Nets", by S. Austin, G. Zavaliagkos, J. Makhoul, R. Schwartz, IEEE 0-7803-0532-9/92, 1992, pp. I-625-I-628.

"Continuous Word Spotting For Applications In Telecommunications", by M-W Feng & B. Mazor, Tu.-sAM.1.5, pp. 21–24.

"Discriminative Analysis For Feature Reduction In Automatic Speech Recognition", by E. L. Bocchieri & J. G. Wilpon, 0-7803-0532-9/92, IEEE 1992, pp. I-501-I-504.

"Segmental GPD Training Of HMM Based Speech Recognizer", by W. Chow, B. H. Juang, C. H. Lee, 0-7803-0532-9/92, IEEE 1992, pp. I-473-I-476.

"Improvements in Connected Digit Recognition Using Higher Order Spectral and Energy Features", by J. G. Wilpon, C-H. Lee, L. R. Rabiner, CH2977-7/91/00-00-0349, 1991 IEEE, pp. 349–352.

"Automatic Recognition of Keywords in Unconstrained Speech Using Hidden Markov Models", by J. G. Wilpon, L. R. Rabiner, C-H. Lee, E. R. Goldman, 0096-3518/90/1100-1870$01.00, 1990 IEEE, pp. 1870–1878.

"A Hidden Markov Model Based Keyword Recognition System", by R. C. Rose & D. B. Paul, CH2847-2/90/0000-0129, 1990 IEEE, pp. 129–131.

"An Introduction to Hidden Markov Models", by L. R. Rabiner & B. H. Juang, IEEE ASSP Magazine, Jan. 1986, pp. 4–16.

*Primary Examiner*—Allen R. MacDonald
*Assistant Examiner*—T. Onka
*Attorney, Agent, or Firm*—Michael B. Johannesen

[57] ABSTRACT

A two-pass classification system and method that post-processes HMM scores with additional confidence scores to derive a value that may be applied to a threshold on which a keyword verses non-keyword determination may be based. The first stage comprises Generalized Probabilistic Descent (GPD) analysis which uses feature vectors of the spoken words and the HMM segmentation information (developed by the HMM detector during processing) as inputs to develop a first set of confidence scores through a linear combination (a weighted sum) of the feature vectors of the speech. The second stage comprises a linear discrimination method that combines the HMM scores and the confidence scores from the GPD stage with a weighted sum to derive a second confidence score. The output of the second stage may then be compared to a predetermined threshold to determine whether the spoken word or words include a keyword.

7 Claims, 3 Drawing Sheets

KEYWORD/NON-KEYWORD CLASSIFICATION IN ISOLATED WORD SPEECH RECOGNITION

TECHNICAL FIELD

This invention relates to the field of automated speech recognition, and, more specifically, to the field of post-processing Hidden Markov Model keyword detection to establish whether a keyword has been detected.

BACKGROUND OF THE INVENTION

One of the better detectors for determining which keyword is present in a given utterance is the Hidden Markov Model (HMM) detector. In the HMM detector, digitized speech is analyzed against statistical models of the set of desired keywords (i.e., "one", "two", "three", etc.) and a score is determined for each of the keywords. The keyword with the highest score is considered to be the "best fit". There is, however, no reliable method for detecting whether a valid keyword has actually been spoken. One method of detecting keywords is to compare the HMM scores to a predetermined threshold. This method represents an initial approach to incorporating rejection in a speech recognizer.

In order to acheive more reliable results, the HMM scores have to be further analyzed (using linear discrimination analysis, for example) to determine whether any of the scores is above a threshold of "goodness" before a determination can be made that a specific utterance was in fact the keyword. However, HMM scores vary widely according to length of the verbal utterance, the speaker, and the speaking environment (i.e., the voice path, the microphone, etc.), which is not correctable even by post-processing with linear discrimination analysis and, thus, a simple comparison with a threshold may not be accurate. Therefore, a problem in the art is that HMM alone or with a linear discrimination analysis threshold determination is not well suited to establish a good test for acceptance of the highest-scoring keyword model.

SUMMARY OF THE INVENTION

This problem is solved and a technical advance is achieved in the art by a two-pass classification system and method that post-processes HMM scores with additional confidence scores to derive a value that may be applied to a threshold on which a keyword verses non-keyword determination may be based. The first pass (stage) comprises Generalized Probabilistic Descent (GPD) analysis which uses feature vectors of the spoken words and HMM segmentation information (developed by the HMM detector during processing) as inputs to develop confidence scores. The GPD confidence scores are obtained through a linear combination (a weighted sum) of the feature vectors of the speech (which are independent of the length of the verbal utterance and the speaking environment). The confidence scores are then delivered to the second pass (stage).

The second stage comprises a linear discrimination method similar to the prior art but, in addition to using the HMM scores as inputs, it also uses the confidence scores from the GPD stage. The linear discrimination method combines the two input values using a weighted sum. The output of the second stage may then be compared to a predetermined threshold. In this manner, the best fit keyword as determined by HMM analysis may be tested to determine whether the spoken word or words include a keyword.

BRIEF DESCRIPTION OF THE DRAWING

A more complete understanding of the invention may be obtained from a consideration of the following description in conjunction with the drawings, in which.

DETAILED DESCRIPTION

Figure 1:
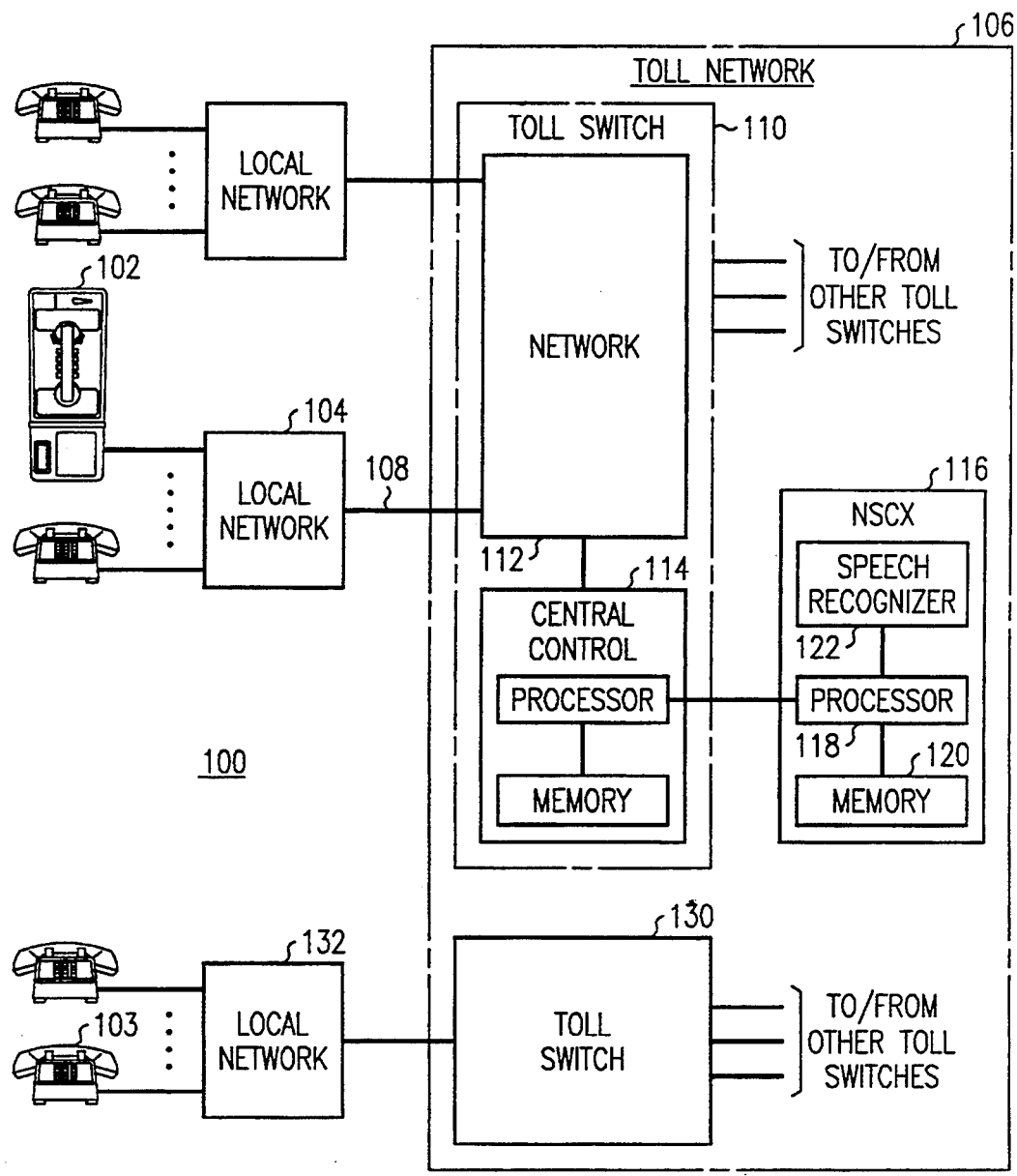
FIG. 1 is a block diagram of the telephone network showing a toll switch equipped with an adjunct processor that includes an exemplary embodiment of this invention.

FIG. 1 is a block diagram of the telephone network 100 incorporating an exemplary embodiment of this invention. A customer at a calling telephone, for example, pay phone 102, wishes to reach a called telephone 103. The customer at pay phone 102 wishes to use a credit card to make a call to telephone 102. The customer dials the telephone number of telephone 103, which is determined by a local switch in local network 104 as a long distance or network call. Local network 104 sends the call into the toll network 106 by seizing an access trunk or channel 108, as is known in the art, to toll switch 110. The call is received at toll switch 110 at switching network 112.

As part of call setup, toll switch 110 records billing information. In this case, a pay phone does not have billing information associated with it; therefore, central control 114 of toll switch 110 connects an adjunct processor to the call. Adjunct processor collects credit card billing information from pay phone 102. For purposes of describing this invention, adjunct processor includes an exemplary embodiment of this invention which collects verbal credit card information, or alternatively verbal collect calling or third party billing information. This invention is not limited to this embodiment, as it may be used to determine the utterance of any keyword.

Adjunct switch 116 comprises a plurality of service circuits, such as speech recognizer 122, a processor 118, and memory 120. Processor 118 connects the call through to voice processor 122, which then audibly prompts the customer at pay phone 102 to speak his/her credit card number. This invention then processes the verbal responses received from the customer at pay phone 102 and determines what, if any, keywords were spoken by the customer at pay phone 102. These keywords are then recorded as the billing number or credit card number (or other appropriate action is taken, as necessary) and call processing proceeds. Toll switch 110 connects to a second toll switch 130, which completes the call to local network 132 and to telephone 103.

Figure 2:
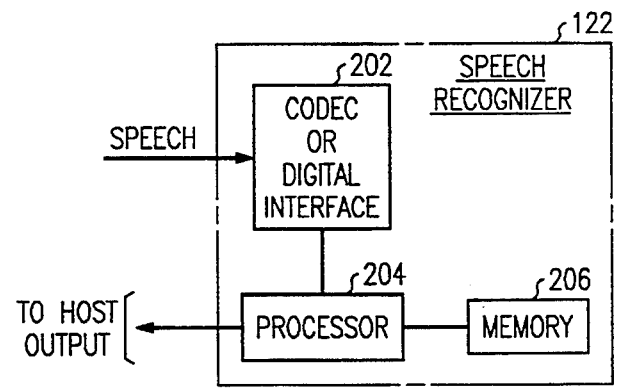
FIG. 2 is a more detailed block diagram of an adjunct processor showing an exemplary embodiment of this invention.

Turning now to FIG. 2, a speech processing unit 122 including an exemplary embodiment of this invention is shown. Incoming speech is delivered by processor 118 of adjunct 116 (FIG. 1) to CODEC or digital interface 202. CODEC 202, as is known in the art, is used in situations where the incoming speech is analog, and a digital interface is used in cases where incoming speech is in digital form. The incoming speech is delivered to a processor 204, which performs analysis of the speech. Memory 206, connected to processor 204, is used to store the digitized speech being processed and to store a program according to an exemplary embodiment of this invention. Processor 204 is responsive to the instructions of the program in memory 206 to process incoming speech and make a determination of a "best" keyword and whether or not that keyword is good enough to be treated as valid. Other implementations of this invention may be readily apparent to one skilled in the art, including hardware circuits that perform the software functions of the described exemplary embodiment. It is therefore intended that all such embodiments be covered by the claims of this application.

Figure 3:
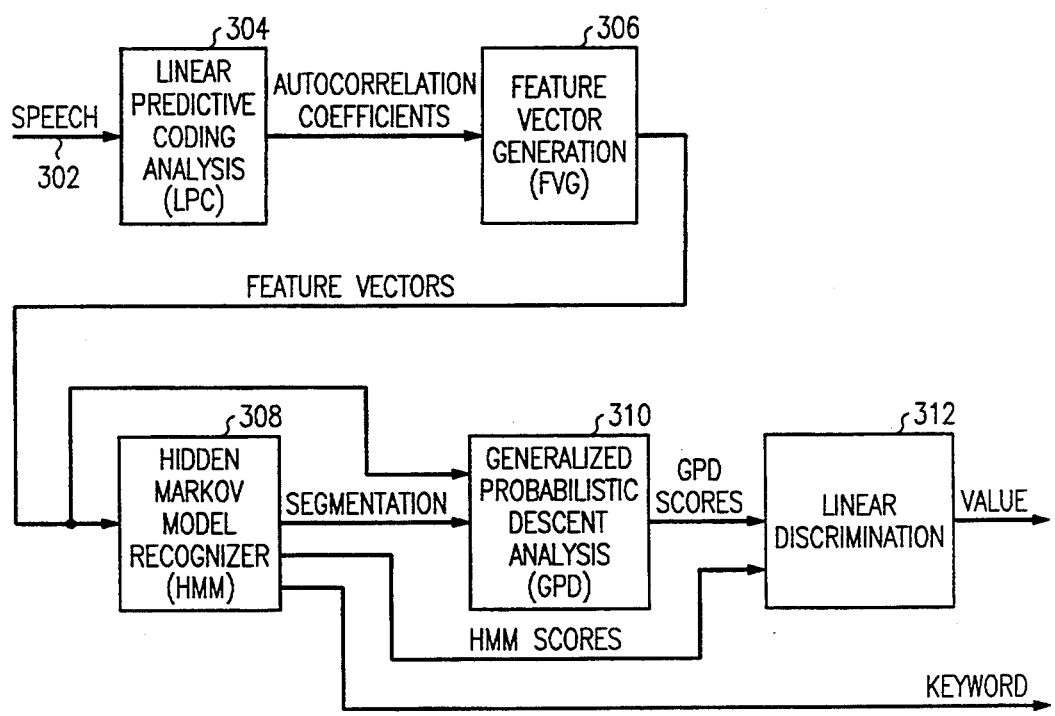
FIG. 3 is a functional block diagram of the processing performed in FIG. 2.

Turning now to FIG. 3, a block diagram of the basic functionality of the exemplary embodiment of this invention is shown. Digitized speech in 8Hz frames is used as input 302 to a linear predictive coding analysis system 304. Linear predictive coding analysis and feature vector generation represent each frame with 24 parameters, as shown in Table 1. For purposes of describing this embodiment of this invention, a 10th order linear predictive coding analysis system is used having a 45 ms window length and 15 ms update rate. A total of 38 parameters are computed, consisting of the first 12 cepstral coefficients, their first derivatives (called the Delta Cepstral Coefficients), the second derivatives (called Delta-Delta Cepstral Coefficients), Delta energy, and Delta-Delta energy. To reduce the computational load, a subset of 24 of the 38 parameters is used to form a recognizer feature vector. This 24 parameter subset is optimally selected using discriminative analysis for feature reduction, as described in E. L. Boccchieri, and J. G. Wilpon, "Discriminative Analysis for Feature Reduction in Automatic Speech Recognition," in Proceeding IEEE International Conference on Acoustics, Speech, Signal Processing, page 501–504, March, 1992. The linear predictive (LP) coding analysis delivers the first 10 autocorrelation coefficients to feature vector generator 306. Feature vector generation uses the memory and produces Table 1 on a frame by frame basis.

TABLE 1

| Recognizer Feature Vector Parameters | | | |
|---|---|---|---|
| Parameter Index | Parameter | Parameter Index | Parameter |
| 1 | cep(1) | 13 | $\Delta$cep(4) |
| 2 | cep(2) | 14 | $\Delta$cep(5) |
| 3 | cep(3) | 15 | $\Delta$cep(6) |
| 4 | cep(4) | 16 | $\Delta$cep(7) |
| 5 | cep(5) | 17 | $\Delta$cep(9) |
| 6 | cep(6) | 18 | $\Delta^2$cep(1) |
| 7 | cep(7) | 19 | $\Delta^2$cep(2) |
| 8 | cep(8) | 20 | $\Delta^2$cep(3) |
| 9 | cep(9) | 21 | $\Delta^2$cep(4) |
| 10 | $\Delta$cep(1) | 22 | $\Delta^2$cep(6) |
| 11 | $\Delta$cep(2) | 23 | $\Delta$energy |
| 12 | $\Delta$cep(3) | 24 | $\Delta^2$energy |

Feature vector generator 306 delivers parameters of Table 1 to a Hidden Markov Model recognizer 308, and to the Generalized Probabilistic Descent (GPD) analysis 310 according to this invention. Each keyword is modeled as a continuous density HMM which uses 8 to 10 states, depending on the specific word, left to right model, with 15 Gaussian mixture components per state. The segment K-means algorithm as described in L. R. Rabiner, J. G. Wilpon, and B. H-Juang, "A Segment K-Means Training Procedure for Connected Word Recognition," AT&T Technical Journal, Volume 65, No. 3, pages 21–31, May-June, 1986, is used to estimate the HMM parameters and the well-known Viterbi decoding algorithm is employed to obtain the optimal HMM path.

Figure 4:
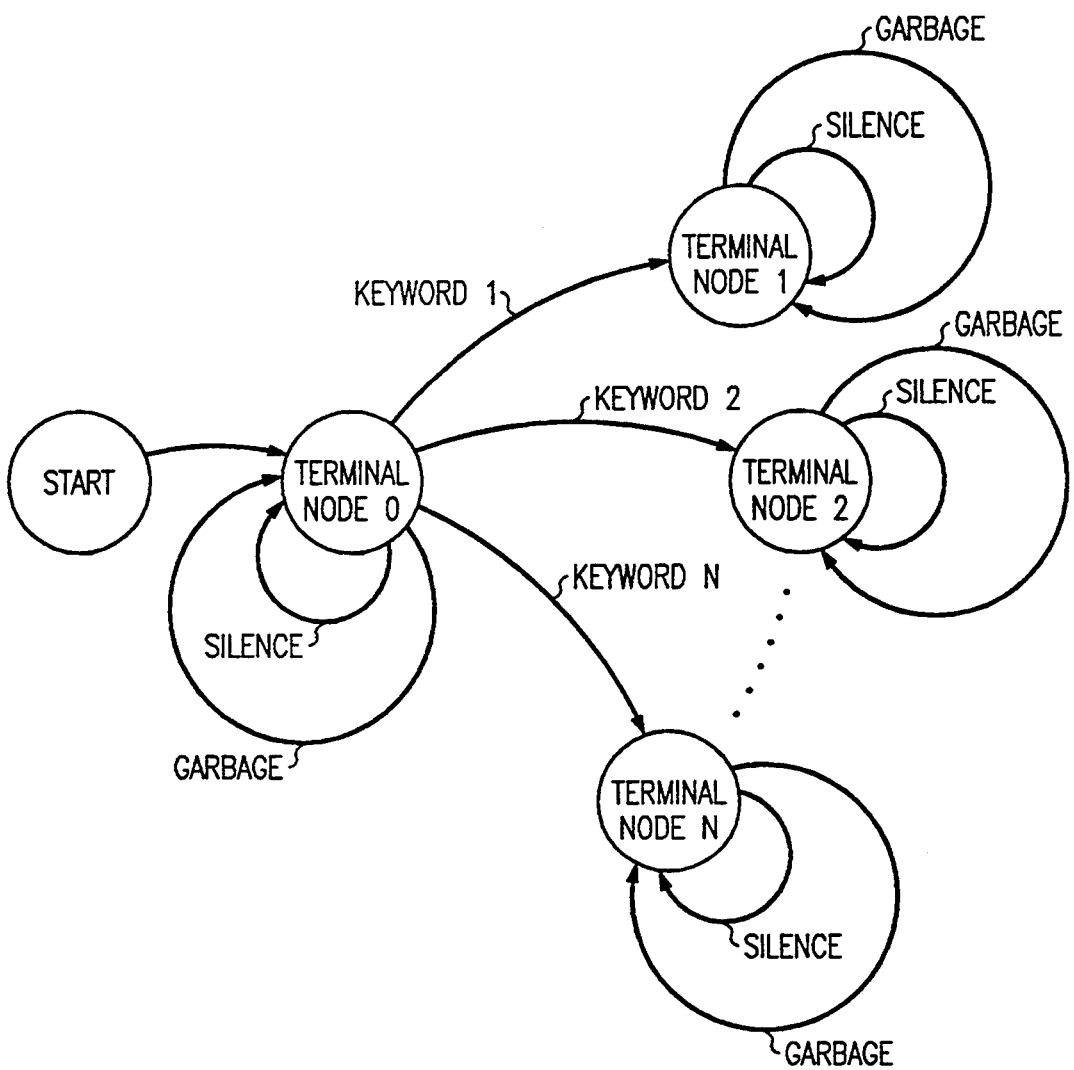
FIG. 4 is a block diagram of a genetic HMM grammar used in the exemplary embodiment of this invention.

FIG. 4 shows a block diagram of a generic HMM grammar that is used for purposes of describing the exemplary embodiment. Every grammar node in FIG. 4 is a terminal node, implying that a separate utterance segmentation is obtained for each node. The silence model in this grammar allows for the recognition of keywords with silence before and after the keyword, while the garbage (filler) model facilitates recognition of keywords imbeded in other speech material. The garbage model parameters are estimated using a database of speech that does not include any of the valid keywords. Including a garbage model significantly increases recognition accuracy when the goal is to word spot a keyword imbeded in extraneous speech. The garbage model can also be used in the keyword/non-keyword classification as discussed below. The garbage database used here comes from three sources: phonetically balanced sentences, speakers speaking their name, and extraneous speech on either side of the keyword collected from an actual recognition trial.

The goal in any classification system is to maximally separate the classes, as seen in FIG. 4. In this case, there are two classes: keywords and non-keywords. The prior art method of making this decision is to use the HMM output itself as a determination for keyword/non-keyword classifier. This can be done by comparing the HMM likelihood score of the garbage node, node 0 in FIG. 4, to the largest likelihood score among the keyword nodes, nodes 1 through N. If the garbage score is larger, then a non-keyword decision can be made. Another option is to set a threshold on the likelihood scores or some combination thereof. Although the HMM classifier has been shown to be very reliable in classifying a closed set of keywords (i.e., predefined set of keywords), its performance on an open set, such as detection of any utterance not containing a keyword, is not very reliable.

Returning to FIG. 3, a two-pass classifier according to the exemplary embodiment of the invention uses the information supplied by the HMM keyword classifier in a two-stage discriminant analysis. The first stage is Generalized Probabilistic Descent (GPD) analysis 310 and a second stage provides linear discrimination analysis 312.

Information supplied by the HMM is employed in a two stage discriminant analysis. The first stage is trained using the Generalized Probabilistic Descent (GPD) discriminant training as described in W. Chou, B. H-Juang, and C-H. Lee, "Segmental GPD Training of HMM Based Speech Recognizer," Proc. IEEE Int. Conf. Acoust., Speech, Signal Processing, pages 473–476, Mar., 1992. The second is trained using Fisher's linear discriminant training method, as described in K. V. Mardia, J. T. Kent, J. M. Bibby, "Multivariant Analysis," London, Academic Press, 1979. The output of the second stage is a classification parameter that can be compared to a threshold to make the final keyword/non-keyword decision. In the case of a keyword decision, the recognition answer is the candidate with the largest HMM likelihood score. Therefore, formally stated, the keyword/non-keyword classification is the classification of two classes. The first class includes all instances where the utterance does not contain any keyword, and the second class includes all cases where the utterance contains a keyword and the largest terminal node likelihood score corresponds to the correct keyword model (i.e., correct HMM recognition).

In operation, incoming speech 302 is, in box 304, segmented into frames and 10 autocorrelation coefficients are computed per frame. The 10 autocorrelation coefficients are passed to box 306, where feature vectors are generated. The feature vectors are passed to Hidden Markov Model recognizer 308, which performs statistical pattern matching between the incoming feature vectors and prestored models.

To perform keyword/nonkeyword classification, boxes 310 and 312 are included. Box 310 receives word and state segmentation information from HMM recognizer 308, and receives the same feature vectors from box 306 as the HMM recognizer 308. Box 310 uses the segmentation information to linearly combine the feature vectors in order to deliver scores that indicate whether a keyword is present or not. Box 312 combines the outputs of GPD 310 with the HMM likelihood scores to produce a single value that is then compared to a threshold. If a determination is made that a keyword is present, then the keyword with the highest HMM likelihood score is designated as a recognized keyword.

THE GPD DISCRIMINATION STAGE

In its original formulation, GPD discriminative training was developed to minimize recognition errors by optimizing with respect to the HMM model parameters. As a framework for discriminative training, the GPD is used to train the first stage of the two-pass classifier. The GPD framework first defines a distance function, and rather than minimize this function directly, a loss function that is itself a function of the distance function is minimized. The purpose of the loss function, which is a monotonic smooth function, is to emphasize the separation of cases that are highly confusable while deemphasizing the less confusable cases.

For this keyword/non-keyword classification problem, the distance function is defined in terms of the HMM segmentation information. The HMM can be thought of as a "time-warper," time-warping a given utterance into a fixed number of states, thereby, allowing the representation of the utterance by a fixed length vector. Similar to the method used in P. Ramesh, S. Katagiri, and C. -H. Lee, "A new connected word recognition algorithm based on HMM/LVQ segmentation and LVQ classification," in "Proc. IEEE Int. Conf. Acoust., Speech, Signal Processing, pp. 113–116, May, 1991, the fixed length vector transformation is accomplished by taking the means of the feature vectors of all the frames in a given state, and then concatenating the slates' mean vectors to form a fixed length vector, called the discriminating vector, for the utterance. In addition to the advantages (from a classification point-of-view) gained by transforming variable length utterances into fixed length vectors, the discriminating vectors enables exploitation of the correlation that exists among states of a keyword model. The HMM grammar of FIG. 4 assumes one model per keyword, and provides a terminal node for every model including garbage. Therefore, for a given utterance, a set of discriminating vectors can be generated, one for each model.

The definition of the distance function starts by first defining a discriminant function as $$R_j(x_j, a_{i,j}) = x_j^t a_{i,j}, j = 1, 2, \ldots, N, g, \quad [1]$$

where $x_j$ is the discriminating vector for keyword model j, N is the number of keywords, "g" denotes the garbage model, "i" is the index of the keyword HMM model with the largest terminal node likelihood score, and $a_{i,j}$ is a vector of weights obtained using the GPD training described below.

Given the above two classes, the goal is to determine $a_{i,j}$, for $j = 1, 2, \ldots, N, g$, such that if the utterance contains no keyword, then $$\max_j [R_j(x_j, a_{i,j})] = R_g(x_g, a_{i,g}), j = 1, 2, \ldots, N, g. \quad [2]$$

Similarly, if the utterance contains a keyword and the HMM recognizes it correctly, the goal is $$\max_j [R_j(x_j, a_{i,j})] = R_i(x_i, a_{i,i}), j = 1, 2, \ldots, N, g. \quad [3]$$

Essentially, equations [2] and [3] convey the fact that to achieve good classification performance, the discriminating function corresponding to the correct class must be the largest.

The discriminating functions are used to define an overall distance function. For implementational convenience, the distance function is defined separately for each of the two classes. Consistent with the GPD framework, the distance function for the non-keyword class is $$d_i(X, A_i) = -R_g(x_g, a_{i,g}) + \log \left[ \frac{1}{N-1} \left( \sum_{j=1}^{N} e^{\eta R_j(x_j, a_{i,j})} \right)^{1/\eta} \right], \quad [4]$$

where
$$X = [x_1 x_2 \ldots x_N x_g], \quad [5]$$

$$A_i = [a_{i,1} a_{i,2} \ldots a_{i,N} a_{i,g}], \quad [6]$$

$\eta$ is a positive number, and "i" is the index of the keyword model with the largest terminal node likelihood score. For the keyword class, $$d_i(X, A_i) = \quad [7]$$

$$-R_i(x_i, a_{i,i}) + \log \left[ \frac{1}{N-1} \left( \sum_{\substack{j=1 \\ j \neq i}}^{N} e^{\eta R_j(x_j, a_{i,j})} + e^{\eta R_g(x_g, a_{i,g})} \right)^{1/\eta} \right].$$

The distance function of equations [4] and [7] is then incorporated in a sigmoid shaped loss function defined as $$L_i(X, A_i) = \frac{1}{1 + e^{-\gamma d_i(X, A_i)}}. \quad [8]$$

where $\gamma$ is a constant used to control the smoothness of the monotonically increasing $L_i(X, A_i)$.

Ideally, the goal is to minimize the expected value, $E[L_i(X, A_i)]$, with respect to $A_i$. However, since the probability density function of X cannot be explicitly determined, a gradient-based iterative procedure is used to minimize the loss function. The gradient procedure iteratively adjusts the elements of $A_i$ according to $$(A_i)_{n+1} = (A_i)_n - \epsilon \overline{\nabla} L_i(X_n, (A_i)_n) \qquad [9]$$

where $\overline{\nabla} L_i(X_n, (A_i)_n)$ is the gradient of the loss function with respect to $A_i$ evaluated at the $n^{th}$ training sample (utterance) $X_n$. Here $\epsilon$ is the update step size.

Two points are worth mentioning here. First, the expected value of the loss function is minimized without explicitly defining the probability density function of X. Instead, the GPD adaptively adjusts the elements of $A_i$ according to the set of observable vectors $\{X_n\}$. Second, a classification error rate function that is not continuous is mapped into a continuous smooth loss function that can be readily minimized.

According to the definition of the distance function given in equations [4] and [7], and the adaptation formula [9], every element in the matrix $A_i$ is adapted every iteration. This can be overwhelming. A simple example illustrates this. Consider the example of recognizing the 11 digits, where, each word is modeled as a 10 state left-to-right HMM. A 10-state left-to-right garbage model is also included. Each frame is converted to a 24-dimensional feature vector, as described above. Therefore, the discriminating vector $x_j$ is of dimension 240, and each matrix $A_i$ is $240 \times 12$, where $i = 1, 2, \ldots, 11$. Adapting 2880 parameters each iteration requires a large number of computations, as well as a long time to converge. Moreover, the larger the keyword set, the larger the number of adapted parameters per iteration. It is therefore desirable to have the number of parameters adapted per iteration manageable and independent of the size of the keyword set.

To achieve this, a modification to the distance function of equations [4] and [7] is needed. The distance function as it is defined incorporates information concerning all the keyword and garbage models. This is useful if the goal is to classify an utterance among N different classes. In the keyword/non-keyword classification case, we are only concerned about two classes. The modified distance function is, therefore, defined as follows. For the non-keyword class, the distance function is $$d_i(X, Z_i) = -R_g(x_g, a_{i,g}) + \log[[e^{\eta R_i(x_i, a_{i,i})} + e^{\eta R_k(x_k, a_{i,k})}]^{1/\eta}, \qquad [10]$$

where "k" is the index of the keyword model with the second largest terminal node keyword likelihood score. For the correct classification class, $$d_i(X, A_i) = -R_i(x_i, a_{i,i}) + \log[e^{\eta R_g(x_g, a_{i,g})} + e^{\eta R_k(x_k, a_{i,k})}]^{1/\eta} \qquad [11]$$

The modified distance function is defined in terms of the discriminating functions for three HMM models, namely, the word model with the largest node likelihood, the word model with the second largest node likelihood, and the garbage model. As will be seen below, incorporating the second largest node likelihood with the other two, provides an added degree of freedom that is used in the second stage discrimination.

THE LINEAR DISCRIMINANT STAGE

The second stage discrimination of the two-pass classifier employs linear discriminant analysis to combine the classification power of the GPD stage with that of the HMM itself. The GPD scores, defined as the numerical values of the discriminating functions of equation [1], are combined with the HMM likelihood scores using linear discrimination. The output of this stage is a classification score that can be compared to a threshold to perform the final keyword/non-keyword decision. Specifically, the parameters used in this discrimination stage form a four dimensional classification vector, y, where $$y_1 = \log P_i(O) - \log P_g(O), \qquad [12]$$

$$y_2 = \log P_i(O) - \log P_k(O), \qquad [13]$$

$$y_3 = R_i(x_i, a_{i,i}) - R_g(x_g, a_{i,g}), \qquad [14]$$

$$y_4 = R_i(x_i, a_{i,i}) - R_k(x_k, a_{i,k}). \qquad [15]$$

Here $P_i(O)$ is the terminal node likelihood corresponding to keyword "i". Again, the indices "i", "k", "g" refer to the keyword model with the largest terminal node likelihood., the keyword model with the second largest terminal node likelihood, and the garbage model, respectively. To obtain a single classification score, the vector y is projected onto a single dimension. The classification score is therefore written as $$C = y^t b_i, \quad i = 1, 2 \ldots, N \qquad [16]$$

where $b_i$ is the projection vector, given that HMM model "i" results in the largest keyword terminal node likelihood. The projection vectors are determined using the Fisher discriminant role as discussed in K. V. Maddia, J. T. Kent, and J. M. Bibby, "multivariant Analysis," London Academic Press, 1979, to maximize the separation between the keyword and the non-keyword class.

$Y_{nokey,i}$ is the classification vector given that the input speech does not contain a keyword and the largest keyword terminal node likelihood corresponds to keyword "i". Further, $Y_{key,i}$ is the classification vector given that the input speech contains the keyword "i" and the largest keyword terminal node likelihood corresponds to word "i". The Fisher discriminant rule determines $b_i$ by maximizing the ratio of the between-classes sum of squares to the within classes sum of squares, as follows, $$F_i = \frac{b_i^t G_i b_i}{b_i^t W_i b_i} \quad i = 1, 2, \ldots, N \qquad [17]$$

where $$G_i = (\bar{y}_{key,i} - \bar{y}_{nokey,i})(\bar{y}_{key,i} - \bar{y}_{nokey,i})^t, \qquad [18]$$

$$W_i = E[v_i v_i^t] + E[u_i u_i^t], \qquad [19]$$

$$v_i = y_{key,i} - \bar{y}_{key,i}, \qquad [20]$$

and $$u_i = Y_{nokey,i} - \bar{y}_{nokey,i} \qquad [21]$$

$\bar{y}_{key,i}$ is the mean classification vector over all utterances containing keyword "i" that the HMM recognizer recognized correctly, and $\bar{y}_{nokey,i}$ is the mean classification vector for utterances not containing a keyword where the largest keyword likelihood corresponds to word "i". Maximizing $F_i$ and solving for $b_i$ gives 22

$$b_i = W_i^1 (\bar{y}_{key,i} - \bar{y}_{nokey,i}), \quad i=1,2,\ldots N. \qquad [22]$$

During recognition, the classification score given in equation [16] is computed using $b_i$ of equation [22]. It is then compared to a threshold to determine if the utterance should be rejected. The value of the threshold depends on the desired operating point of the recognizer.

It is to be understood that the above-described embodiments are merely illustrative principles of the invention, and that many variations may be devised by those skilled in the art without departing from the scope of the invention. It is, therefore, intended that such variations be included within the scope of the appended claims.

I claim:

1. A method to establish whether a speech signal comprising digitized speech represents a keyword, said method comprising the steps of:
   transforming said digitized speech signal into feature vectors;
   processing said feature vectors in a Hidden Markov Model (HMM) keyword detector, said (HMM) keyword detector having output signals representing speech segmentation information and signals representing scores of a set of keywords compared to said digitized speech signal;
   forming a discriminating vector by deriving mean vectors from said feature vectors and concatenating said mean vectors with said segmentation information;
   non-linearly processing said discriminating vector to derive a first set of weighting factors, and linearly combining said feature vectors and said discriminating vector using said first set of weighting factors to develop a first set of confidence scores;
   processing said first set of confidence scores and said signals representing keyword scores from said HMM keyword detector with a second weighting factor to develop a second confidence score; and
   comparing said second confidence score to a threshold to determine whether a keyword has been detected.

2. A method in accordance with claim 1 wherein said first weighting factors are developed using general probablistic descent training.

3. A method in accordance with claim 2 wherein said second weighting factor is developed using Fisher's linear discrimination training.

4. A keyword detection apparatus that determines whether a digitized speech signal includes one of a preselected plurality of keywords, said apparatus comprising:
   means for receiving input signals representing digitized speech and developing a plurality of signals representing feature vectors of said digitized speech;
   means responsive to said input signals and said signals representing feature vectors of said digitized speech for developing segmentation information regarding said speech signals and a plurality of HMM keyword scores by comparing said speech signals to each of said preselected plurality of keywords,
   means for receiving said feature vectors and said segmentation information and combining them to determine a first set of confidence scores;
   means for receiving said HMM keyword scores and said first confidence scores and combining them to determine a second confidence score; and
   means for comparing said second confidence score against a threshold value for determining whether the keyword having the highest score is present in said input signals.

5. A keyword detection apparatus in accordance with claim 4 wherein said combining to determine a first set of confidence scores is based on general probablistic descent training.

6. A keyword detection apparatus in accordance with claim 4 wherein said combining to determine a second confidence score is based on Fisher's linear discrimination training.

7. A method to establish whether a speech signal comprising digitized speech represents a keyword, said method comprising the steps of:
   processing said speech signal into a plurality of feature vectors;
   processing said speech signal by a Hidden Markov Model (HMM) keyword detector, said HMM keyword detector developing signals representing speech segmentation information and signals representing keyword scores of a set of keywords compared to said speech signal;
   forming a discriminating vector by deriving mean vectors from said feature vectors and concatenating said mean vectors with said segmentation information;
   non-linearly processing said discriminating vectors to develop a first plurality of weighting factors using general probablistic descent training and linearly combining said feature vectors and said discriminating vector using said first plurality of weighting factors to develop a first set of confidence scores;
   processing said first confidence scores and said signals representing keyword scores from said HMM keyword detector with second weighting factors to develop a second confidence score, said second weighting factors being derived using Fisher's linear discrimination training; and
   comparing said second confidence score to a threshold to determine whether a keyword has been detected.

* * * * *